United States Patent [19]

Bailey

[11] Patent Number: 4,633,423
[45] Date of Patent: Dec. 30, 1986

[54] COHERENT ERROR SUPPRESSION IN DIGITAL TACHOMETERS AND THE LIKE

[75] Inventor: Roger G. Bailey, Lafayette, Colo.

[73] Assignee: Storage Technology Corporation, Louisville, Colo.

[21] Appl. No.: 593,723

[22] Filed: Mar. 27, 1984

[51] Int. Cl.⁴ .............................................. G05B 11/01
[52] U.S. Cl. .................................... 364/571; 318/327; 318/618; 318/632; 364/565
[58] Field of Search ............... 364/571, 565, 572, 574; 318/327, 618, 632; 360/78; 324/166, 160

[56] References Cited

U.S. PATENT DOCUMENTS

| | | | |
|---|---|---|---|
| 3,968,434 | 7/1976 | Dixon et al. | 364/565 X |
| 4,136,365 | 1/1979 | Chick et al. | 360/78 |
| 4,216,419 | 8/1980 | van Dam et al. | 318/327 |
| 4,250,555 | 2/1981 | Mitchell et al. | 364/571 |
| 4,270,073 | 5/1981 | Harman | 318/632 |
| 4,281,388 | 7/1981 | Friend et al. | 364/565 |
| 4,286,318 | 8/1981 | Immink et al. | 364/118 |
| 4,288,731 | 9/1981 | Lee | 318/618 |
| 4,323,976 | 4/1982 | Radaelli et al. | 364/565 |
| 4,418,392 | 11/1983 | Hata | 364/571 |
| 4,446,409 | 5/1984 | Rawicz et al. | 318/327 X |
| 4,499,547 | 2/1985 | Inuiya et al. | 364/571 |
| 4,506,312 | 3/1985 | Chan et al. | 364/565 X |
| 4,535,288 | 8/1985 | Vitulli, Jr. | 364/565 X |

OTHER PUBLICATIONS

"Understanding and Measuring Phase Noise and the Frequency Domain", (Cover and pp. 3–11), Application Notes 207, Hewlett Packard.

Primary Examiner—Edward J. Wise
Attorney, Agent, or Firm—Woodcock Washburn Kurtz Mackiewicz & Norris

[57] ABSTRACT

Synchronous or coherent error appearing as one or more FM sidebands in the high frequency pulse signal of an incremental position encoding digital tachometer or the like and in an error signal having a magnitude representing the difference in velocity between that indicated by the high frequency signal and a desired velocity is suppressed in the error signal by a coherent error correction signal of varying magnitude which is combined with the error signal, is generated as a function of mechanical angular position and is identical from cycle to each cycle of the tachometer for the same mechanical angular position.

18 Claims, 10 Drawing Figures

COHERENT ERROR SUPPRESSION IN DIGITAL TACHOMETERS AND THE LIKE

FIELD OF THE INVENTION

The invention relates to error correction for digital tachometers and other velocity indicating devices using incremental position encoding and, in particular, to devices and methods for suppressing frequency modulation sidebands which appear in the digital output of such devices from systematic error sources in the devices.

BACKGROUND OF THE INVENTION

Digital tachometers typically include some type of incremental position encoder which divides the rotational cycle of a coupled rotating shaft into a number of substantially equal and regular incremental rotations. The encoder is used to generate a high frequency pulsed signal (hereinafter referred to as a "high output signal") outputted by the tachometer. The shaft rotational (once around) speed in revolutions per second ("rps") is equal to the frequency of the high output signal in hertz divided by the number of incremental positions into which the shaft rotation is divided by the encoder.

Tachometers are often used with motors for speed control. For example, motor speed can be controlled by phase comparison of the pulses of the high output signal of the tachometer (or a signal derived from it) with the pulses from a high frequency quartz clock or other accurate timing device. When the tachometer signal and clock signal are not of the same phase or frequency, an error signal is generated having a magnitude related to the magnitude of phase difference and a polarity indicating lag or lead. The error signal is passed through a control loop filter and applied to a gain control unit for adjusting the magnitude of the current supplied to the motor. Motor speed is thus ultimately controlled by the clock.

To some degree, the high frequency output of each digital tachometer contains FM sidebands which arise from manufacturing imperfections. The sideband components caused by the tachometer are referred to as "tach runout". Sidebands produced by the motor coupled with the tach are referred to as "torque ripple". Hereinafter they will be referred to together generically as "coherent jitter". Typically, the dominant FM sideband of a tachometer output signal is displaced from the signal frequency by the rotational speed of the tachometer. Other sidebands appear at multiples of the rotational speed. All such sidebands are undesirable as they constitute false indications of velocity variation and thus limit the short term stability of the motor speed control.

One method to reduce the tach runout component has been to provide a notch filter at the once around frequency or rotational speed (rps) of the tachometer. However, this approach limits the loop bandwidth by decreasing the phase margin, especially near the once around frequency of the tachometer. Also, as the filter notch frequency is fixed and must be selected for the rotational frequency of the motor and tachometer, the filter must be replaced or a number of filters provided in order to operate the motor at more than one speed.

Another technique previously used to cancel tach runout is to use two tachometers and configure them in such a way as to have their errors cancel each other. This approach adds mechanical complexity, and the cancellation is only as good as the match between the two tachometers.

OBJECTS OF THE INVENTION

It is a first object of the invention to suppress FM sidebands in the high output signal of a digital tachometer or other comparable velocity indicating device that are coherent, i.e. those sidebands which repeat in phase and amplitude for any given mechanical angular position of the tachometer, at the various operating speeds of the tachometer.

A second object of the invention is to suppress coherent FM sidebands without limiting the control loop bandwidth, particularly without reducing the control loop phase or gain margin at any rotational frequency of the tachometer.

A third object is to suppress coherent FM sidebands at any tachometer rotational speed without requiring recalibration.

A fourth object is to accomplish the above object electronically so as to avoid increasing the mechanical complexity of the system.

A fifth object is to minimize the cost and complexity of an error suppressing system by limiting error suppression to suppressing coherent errors.

A sixth object is to suppress the short term variations in the angular rotational velocity of digital tachometer controlled devices which are coherent to angular position of the tachometer.

SUMMARY OF THE INVENTION

The aforesaid objects and others are accomplished by the present invention. According to the invention, a digital tachometer outputting a high output signal is combined with an error sensing circuit of conventional construction and operation for generating a velocity error signal indicative of the difference between velocity indicated by the high output signal of the tachometer and a desired velocity. The high output signal is a pulse stream having a pulse frequency many times greater than the rotational (once around) frequency of the tachometer, the pulses being generated at each of a multiplicity of substantially regularly spaced incremental rotations (i.e. incremental mechanical angular positions) of the tachometer. Also provided is an error correcting circuit which generates the same error correction signal during each rotational cycle of the tachometer. The correction signal is a synthesization of a coherent error component of the high output signal appearing in the error signal. The correction signal is also a function of tachometer mechanical angular position and has the same value for the same incremental position of the tachometer during each of its rotations regardless of encoder operating speed. A summing amplifier or other suitable means is provided for combining the error signal and the correction signal in a manner so as to generate a corrected error signal from which at least some portion of coherent error has been removed. It is envisioned that the invention would be applicable to other, non-rotational digital velocity control systems using incremental, position encoding along a path of movement for velocity control.

According to one important aspect of the invention, the error correcting circuit includes a memory unit for storing a digitized representation of the correction signal in the form of a plurality of digital values in a predetermined sequence. The memory unit outputs the values in the predetermined sequence during each rotational cycle of the tachometer. The digital memory unit is clocked with the high output signal of the tachometer and outputs a single digital value in response to a pulse of the high output signal thereby correlating the correction signal to the coherent error in the error signal at all tachometer rotational speeds.

According to another aspect of the invention, the error correcting circuit is further responsive to an index pulse for reinitiating the output of the stored digital values in the aforesaid predetermined sequency in the subsequent rotational cycle of the tachometer. The index pulse is generated on each occasion when the tachometer is in the same relative mechanical angular position and thus conveniently signals each complete rotational cycle of the tachometer.

Another aspect of the invention is that the error correcting circuit is provided with a delay circuit which is responsive to an index pulse for generating a delayed signal reinitializing the memory unit so as to begin the output of the stored digital values in the predetermined sequence in the subsequent rotational cycle of the tachometer. The delay unit is clocked with the pulses of the high output signal to assure generation of the index pulse at the same mechanical angular position of the tach during each of its revolution cycles regardless of its rotating speed. After a predetermined number of pulses following the index pulse, the delay generates a signal suitable to reset the memory unit. Prefereably too, the delay unit is programmable or otherwise includes suitable means for adjusting the number of pulses between the index pulse and the generation of a memory reset or "reinitialization" signal. This latter feature aids in adjusting the phase of the correction signal to coincide with the phase of the coherent component in the error signal and further allows the use of a standard error correction unit with different tachometers.

The output of the memory unit is connected with the input of a digital to analog converter whereby the stored digital values outputted by the memory unit are converted into an analog signal. An important feature of the invention is that the digital to analog converter is capable of adjusting the amplitude of the analog signal generated by the converter. With the provision of a programmable delay circuit and a memory unit outputting the values of one period of a sine or comparable trigonometric function during one tachometer period, the error correcting circuit can be adjusted to remove or at least reduce the first harmonic of the coherent error in the error signal output of any particular digital tachometer.

According to yet another important aspect of the invention, any of a number of waveforms may be used to generate a correction signal. The correction signal may be synthesized by digitizing the actual coherent component waveform of the error signal (or its inverse). Alternatively, since the coherent error will have major components appearing at the rotational frequency of the tachometer and multiples thereof, the correction signal can be an approximation of one or more complete periods of a sine or comparable trigonometric function in a manner of a Fourier reconstruction of the coherent error waveform. The predominant coherent error contribution typically occurs at the rotational frequency of the tachometer. This first harmonic of the coherent error component can be reduced if not eliminated by generating a correction signal from stored digital values outputted to approximate the relative amplitudes of one period of a sine function waveform. Where it is desired to reduce higher order harmonics of the coherent error component, the stored digital values may be generated to approximate the relative amplitudes of the sum of a first harmonic function and at least one other harmonic function in a Fourier reconstruction of the coherent error waveform. Alternatively, a plurality of digital memory units can be provided, each storing the sequential values of a single trigonometric function for one or more complete periods of the function. Summing amplifiers or other suitable means then combine the outputs of the individual memory units to form a composite correction signal for combining with the error signal.

According to yet another important aspect of the invention, coherent error correction may be beneficially employed as part of a motor speed control circuit. The error correcting circuit eliminates variations in the motor speed arising from the presence of coherent error in the tachometer high output signal. Elimination of these variations improves short term stability of the motor speed.

BRIEF DESCRIPTION OF THE DRAWINGS

The above enumerated objects and aspects of the invention and others will be apparent from the following detailed description of preferred and other embodiments of the invention and an examination of the accompanying drawings in which.

DETAILED DESCRIPTION OF THE INVENTION

Figure 1:
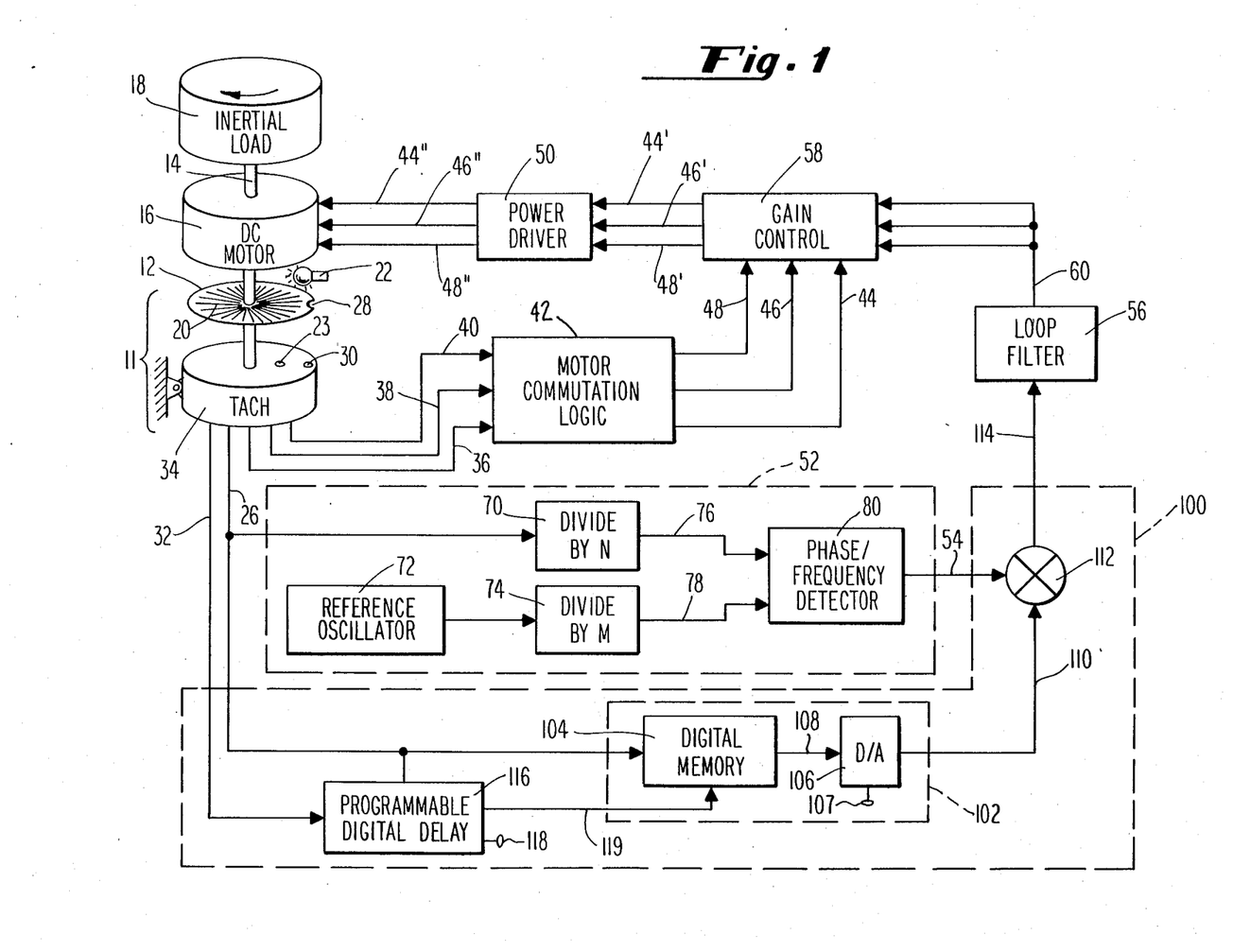
FIG. 1 is a diagrammatic representation of a DC motor with a digital tachometer speed control circuit incorporating FM coherent tach runout error correction.

FIG. 1 depicts a conventional 3-phase DC motor 16 with associated motor speed control circuitry incorporating a digital tachometer 11 with coherent FM error suppression of the invention. The digital tachometer 11 may be of any of a wide variety of known configurations. One such well-known configuration is illustrated and includes an encoder disc 12 coupled to a driven shaft 14 of the motor 16. Also coupled to the shaft 14 is inertial load 18 being driven by the motor in the one direction indicated by the arrow. The encoder disc 12 is provided with a multiplicity of apertures in the form of radial cutouts or slits 20 which are regularly spaced (as well as manufacturing tolerances will allow) at regular angular increments around the disc 12. Cooperating with the slits 20 are a light source 22 on one side of the disc 12 and a photocell 23 on an opposing side of the disc. Rotation of the disc 12 on the shaft 14 causes the light path between the light source 22 and photocell 23 to be broken by the solid portion of the disc 12 between the slits 20. The photocell 23 outputs a pulse each time the light path from the light source 22 is reestablished by a slit 20. Thus each pulse corresponds to the rotation of the shaft 14, motor 16, and load 18 an incremental amount equal to the mechanical angular displacement between adjoining slits 18. In this way, the encoder divides the rotational movement of the motor, shaft and load into a number of substantially regularly spaced incremental segments and generates a single pulse in conjunction with a movement through each segment. At speed, the photocell outputs a pulsed signal of relatively high frequency on line 26, each pulse being generated after regular incremental angular displacements of the disc 12 and shaft 14 during their rotation. The frequency of the pulsed signal generated by the photocell 23 and outputted on lines 26 (hereinafter referred to as the "high output signal") is nominally equal to the motor rotation speed (in revolutions per second) times the number of slits 20 in the disc 12. Additionally, means are also provided to generate a single pulse to mark a complete rotation of the shaft 14 and disc 12. A variety of methods and apparatus may be provided to accomplish this. One method is depicted in FIG. 1 by the provision of a notch 28 in the circumferential edge of the disc 12 at one point and a second photocell 30 which outputs a pulse when the notch 28 is aligned with a light path between the light source 22 and the second photocell 30. The light path is broken by the remainder of the edge of the disc 12 at all other positions. The pulse generated by the second photocell 30 is hereinafter referred to as the "index" pulse and the index signal carrying the index pulse is outputted from the tachometer on line 32.

Typically, additional tachometer electronics, indicated diagrammatically by the block 34, are provided to process the high output signal or otherwise generate pulse or voltage level signals to control phase switching of the DC motor 16. This is also illustrated diagrammatically by the provision of three additional lines 36, 38, and 40 from the tachometer circuit block 34 carrying such pulse or voltage level signals to a suitable and conventional commutation logic circuit block 42 which transforms the outputs on lines 36, 38 and 40 into voltage level signals of proper polarity and duration outputted on lines 42, 44 and 46 for generating separate drive voltages for the stators of the DC motor. This is accomplished by using the voltage level signals to control three power amplifiers indicated diagrammatically and collectively by a power driver circuit block 50, which generate drive currents fed to the stator elements of the DC motor 16 on lines 44", 46" and 48".

Motor speed is controlled by an error sensing circuit 52 which generates an error signal carried on line 54. After being fed through an appropriate control loop filter circuit 56 configured for stability of the particular control loop being employed, the filtered error signal is passed on line 60 to a gain control circuit 58. The filtered error signal is used to vary the gain of the voltage level signals outputted by the commutation logic circuit 42 on lines 44, 46 and 48. Gain control may be provided by any of a number of standard procedures, including the provision of voltage controlled variable gain amplifiers, each of which has as an input one of the polarity signals carried on lines 44, 46 or 48 and as a separate input the filtered error signal carried on line 60. The gain adjusted polarity signals are passed on lines 44', 46' and 48' to the power driver circuitry 50. In this way, motor speed is controlled by the error sensing circuit 52.

The error sensing circuit 52 may also be implemented in any of a number of well-known ways. A preferred method is depicted. The high output signal 26 generated by the digital tachometer 11 is passed to a divider circuit 70 which reduces the frequency of the high output signal by some factor N to some nominal base frequency. The high frequency output signal of a crystal oscillator 72 or other accurate timing source is similarly divided down by another divider circuit 74 which reduces the oscillator frequency by some other factor M to the same nominal base frequency. The high output signal at base frequency is passed on line 76 to a conventional phase difference detection circuit 80. The oscillator output signal at base frequency (hereinafter referred to as the "reference signal") is passed on line 78 to the detection circuit 80. The circuit 80 determines the phase difference between pulses of the high output signal at base frequency and pulses of the reference signal by phase comparison. When the pulses of the high output signal at base frequency on line 76 and the frequency of the reference signal on line 78 are not in phase, an error voltage is generated by the phase detector circuit 80. The phase detector circuit 80 outputs the aforesaid error signal on line 54. The error signal has a magnitude related to the magnitude of phase difference between pulses of the high output signal at nominal base frequency and pulses of the reference signal and a polarity related to the lag or lead of the high output signal relative to the reference signal.

Due to irregularities in the components of the tachometer, particularly irregularities in the encoder disk 12, (and indeed, in the structure and tolerance of the motor parts), the tachometer 11 will output a high output signal which includes a coherent error component. Coherent errors are ones which occur identically and repeatedly in magnitude, polarity and phase in each rotational cycle at all operating speeds of the tach and appear as one or more FM sidebands in the high output signal of the tach 11. Coherent errors are passed in the high output signal through the phase detection circuit 80 and thus appear in the error signal outputted by that circuit on line 54. However, these are not true speed variations in the motor 16 but merely the appearance of such variations and thus lead to short term instability in the control loop when motor current is subsequently varied in response to their presence.

To eliminate these "false" and regularly recurring velocity errors, the invention provides an error correcting circuit 100. The error correcting circuit includes a correction function generator 102 formed by digital memory unit 104, the output of which is passed on a digital channel 108 to a digital to analog converter 106. Preferably, the digital to analog converter 106 is one incorporating a gain programmable amplifier or comparable capability in order that the magnitude of the analog signal outputted by the converter 106 on line 110 is adjustable. This gain adjustment capability is represented diagrammatically by an adjustment knob 107. The error correcting circuit 100 further includes a summing amplifier or similar means, indicated diagrammatically by a summing junction 112, for combining the error signal on line 54 with the correction signal on line 110 to generate a corrected error signal outputted from the summing junction 112 on line 114 to the loop filter 56. The corrected error signal carried on line 114 is the error signal of line 54 with its coherent error component removed or reduced in a significant way.

The digital memory unit 104 is a conventional programmable read-only memory ("PROM") with an associated memory address generator formed from a suitably configured adjustable digital counter circuit, or the like. The unit stores a multiplicity of digital values which, when outputted in a sequence predetermined by the unit (actually the address generator), approximate the waveform of the inverse of the coherent error component appearing in the error signal on line 54 or at least one harmonic component of that waveform. Each value stored in the digital memory unit 104 is clocked out of the memory by a pulse of the high output signal on line 26. The individual stored values thus represent an approximation of the coherent error or a portion of that error appearing in the error signal at regularly spaced incremental angular positions of the disk 12. The address generator is resettable during each rotation in response to a pulse so as to reinitialize the function generation process at least once per rotational cycle of the tach.

To make the error correcting circuit 100 more adaptable, a programmable digital delay circuit 116 is also provided. This enables the user to phase adjust the correction signal output with the occurrence of the coherent error component in the high output signal. Each delay cycle of the programmable digital delay circuit 116 is initiated by the index pulse on line 32 and the delay is measured by clocking the circuit 116 with the high output signal on line 26. The delay adjustment capacity is again indicated diagrammatically in FIG. 1 by an adjustment knob 118. After a predetermined delay, the delay circuit 116 outputs a reinitializing signal on line 119 to the digital memory unit 104 which resets the memory 104 for repeating the output of the stored values in the predetermined sequence. The delay circuit can be made in a conventional fashion by suitable configuration of a digital counter circuit. The address generator of the memory unit 104 resets in response to the pulse on line 119.

It has been observed that the predominant coherent error component (FM sideband) occurs at the rotational frequency of the motor 16. This error can be removed by approximating one complete period of a sine (or cosine) function with the digital memory unit 104. The digital to analog converter 112 will generate an analog signal having a waveform approximating one complete period of the function with each rotational cycle of the motor 16 and encoder disc 12. The programmable digital delay 116 is adjustable to allow the function correction signal to be initiated at any incremental position of the motor 116. When combined with the amplitude adjustment capacity 107 of the D/A converter 106, it makes the error correcting circuit 100 adaptable to any particular tachometer having the same encoder 12 angular resolution.

One skilled in the art will appreciate that if a summing junction 112 is provided to sum the analog signals on lines 54 and 110, the function generator 102 will be configured to output a correction signal having a waveform which is inverse to the waveform of the coherent error occurring in the error signal on line 54 at the same time. A correction signal duplicating or approximating the coherent error component of the error signal on line 54 would be used if a means of differencing these signals on line 54 and 110 were provided in place of the summing junction 112. One skilled in the art will similarly recognize that more complex digital memory arrangements may be provided to generate, for example, intermediate correction function values for smoothing of the correction error signal waveform or to generate different correction signal values only after multiple pulse sequences in the high output signal to reduce the number of digital memory storage locations which must be allocated at the expense of smoothness of the correction function waveform. However, according to the invention in all cases, the same correction function signal will be generated for the same incremental rotational position of the encode 12 during each of its rotations regardless of operating speed.

Figure 2:
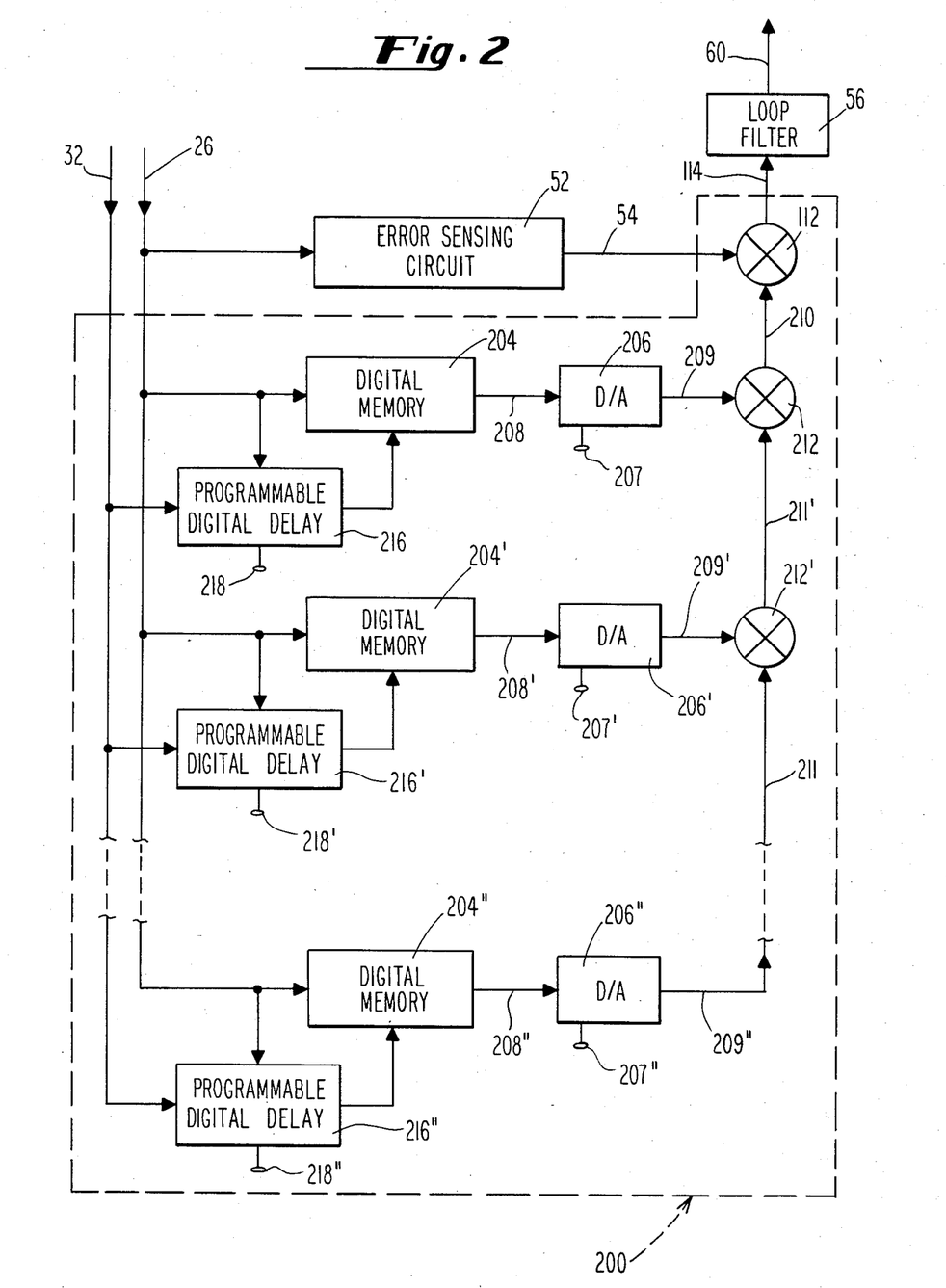
FIG. 2 is a diagrammatic representation of an alternate embodiment of the error correcting circuit in FIG. 1.

Rather than synthesize a single period of a sine or cosine function, a correction signal may be generated by digitizing and storing values representing the coherent error waveform (or its inverse) generated from the error signal itself. Alternatively, a composite correction signal can be synthesized by digitizing a combination of two or more sine and/or cosine trigonometric functions in a Fourier approximation of the coherent error component. If a composite error signal in the form of a Fourier series construction is desired, the alternate embodiment error correction circuit 200 depicted in FIG. 2 is useful. This correction circuit includes a plurality of digital memory units 204, 204' and 204" the outputs of which are each connected to the input of identical, gain adjustable digital to analog converters 206, 206' and 206" with independent amplitude adjustments 207, 207' and 207". Also associated with each memory unit is a programmable digital delay circuit 216, 216' and 216" with programmable adjustment indicated by knobs 218, 218' and 218". Each memory unit stores values approximating the waveform of a separate function representing one harmonic component of a composite correction function. The digital values are outputted by the units 204, 204' and 204" on channels 208, 208' and 208" to the converters 206, 206' and 206" which convert the digital values to analog signals on lines 209, 209' and 209". The converters 206, 206' and 206" and delay circuits 216, 216' and 216" are gain adjustable and programmable, respectively, to allow the gain and phase of each synthesized harmonic function to be independently adjusted. Summing junctions 212 and 212' combine the individually synthesized analog signals outputted on lines 209, 209' and 209" to generate a composite analog correction signal on line 210 which is then combined in the same summing junction 112 with the error signal on line 54. In many cases it will be sufficient to employ only the embodiment depicted in FIG. 1 synthesizing the waveform of a single full period harmonic function to remove a significant portion of the coherent error component.

Figure 3:
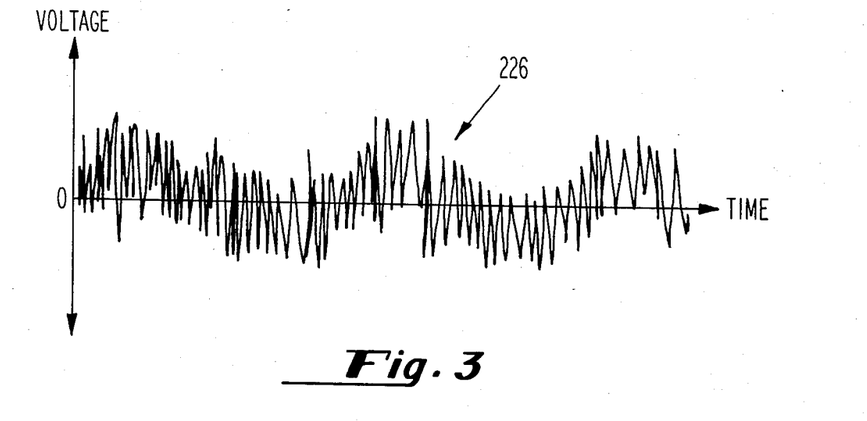
FIG. 3 is a hypothetical error signal without correction generated by the digital tachometer of FIG. 1.
Figure 4:
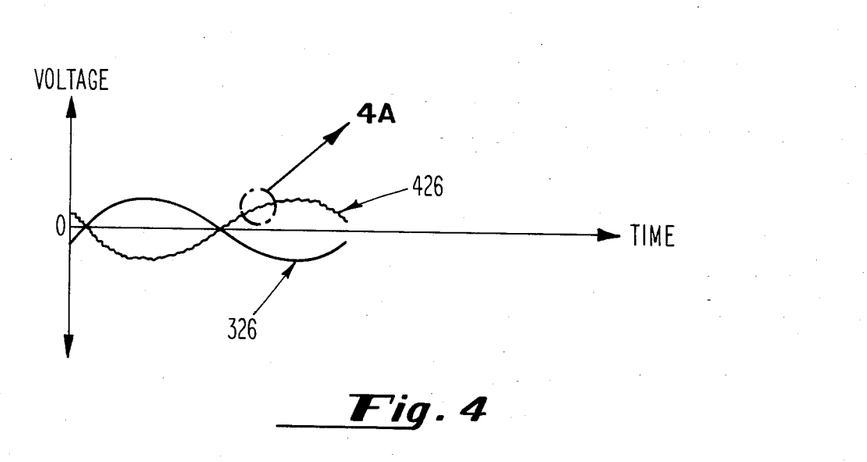
FIG. 4 depicts a hypothetical coherent error waveform generated from the error signal of FIG. 3 an a synthesized correction signal.

FIG. 3 depicts a hypothetical error signal waveform 226 generated by the speed control circuit on line 60. The waveform has no correction for coherent error. FIG. 4 depicts a complete period of a hypothetical coherent error waveform 326 present in the signal 226. The form 326 can be generated by summing portions of the high output signal waveform 226 of FIG. 3 over identical periods, in this case, over one complete tachometer rotation. Summing reduces random noise occurring in the high output signal 226 while reinforcing the coherent error component which regularly occurs in that signal, leaving a coherent error component 326 which, when compared with the same component present in the high output signal 226, has an improved signal to noise ratio. The coherent jitter error waveform 326 generated while driving the tachometer 11 with the motor 14 includes both tach runout and torque ripple contributions. A tach runout coherent error component can be produced by generating the error waveform 326 while free-wheeling the tachometer 11 and load 18.

Figure 4A:
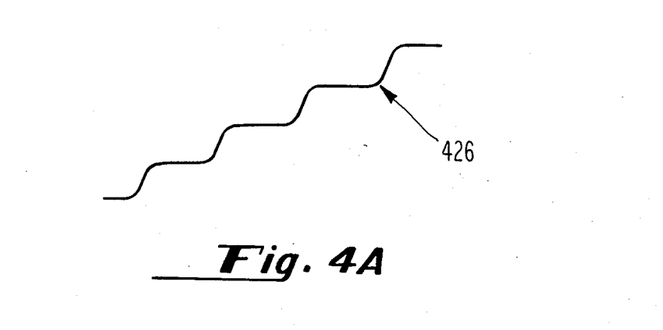
FIG. 4A is an enlargement of area 4A of the synthesized signal showing its stepped form.
Figure 5:
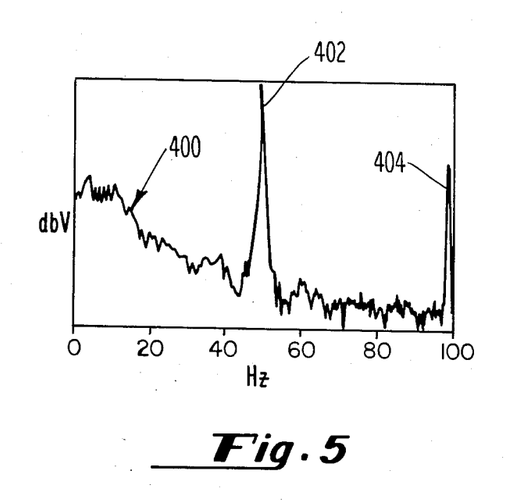
FIG. 5 depicts a sample error signal of the type in FIG. 4 in the frequency domain.
Figure 6:
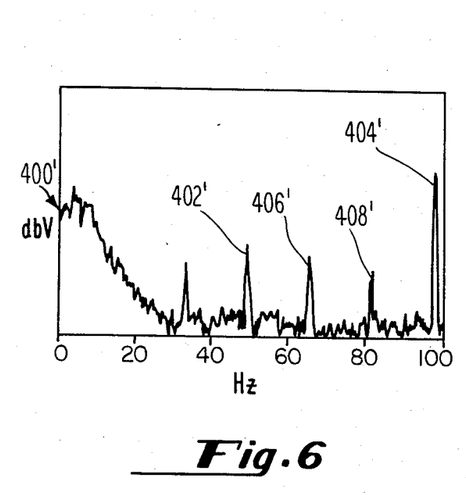
FIG. 6 depicts a sample corrected error signal in the frequency domain.
Figure 7:
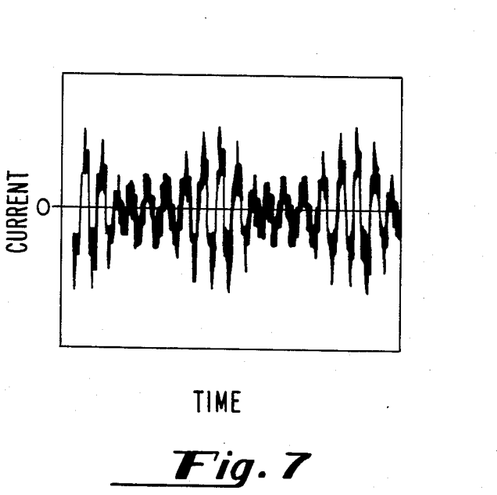
FIG. 7 depicts a sample motor current signal generated by another error signal without correction.
Figure 8:
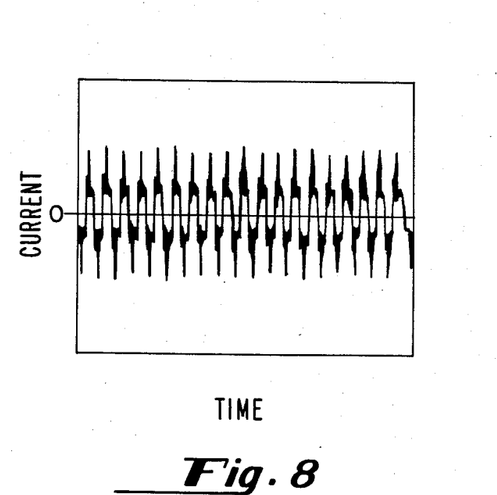
FIG. 8 depicts a motor current signal generated by the other error signal after correction by the invention.

When the filtered but uncorrected error signal on line 60 is passed through the Hewlett Packard Model 3045a or other spectrum analyzer, the analog error signal is converted to a frequency domain representation having a form similar to the waveform 400 depicted in FIG. 5. "Understanding and Measuring Phase Noise In the Frequency Domain, Application Note 207", published by Hewlett Packard, described to some extent this phenomenon and the capability and operation of the analyzer and is incorporated by reference herein in its entirety. Discrete frequency 402 occurs at the rotational frequency of the motor 16 while discrete frequency 404 occurs at the first multiple of that frequency. These discrete frequencies 402 and 404 represent at least a portion of the coherent error. A correction signal waveform 426 for the coherent error component 326 of FIG. 4 is also indicated in that figure. The stepped nature of the correction signal waveform arising from the use of discrete, stored correction values is illustrated in a magnified representation in FIG. 4A. Again, the synthesized error signal may be an approximation of a sine or cosine function, a composite of several such functions or simply an approximation of the coherent error waveform 326 (or its inverse). Utilizing the spectrum analyzer or a comparable device, the amplitude of the correction signal 426 may be adjusted using the gain control 112 of the digital to analog converter 106 and the phase of the correction signal adjusted with respect to the phase of the high output signal by the delay circuit adjustment 118 so as to optimize the reduction of the magnitude of the largest discrete frequency component 402 occurring at the rotational frequency of the motor. Such reduction is indicated in FIG. 7 by the waveform 400' of a corrected error signal removed from line 60 of FIG. 1 and presented in the frequency domain. Resolution limitations of the error correcting circuits 100 and 200 do not make complete correction possible and may lead to the generation of smaller coherent errors such as those causing discrete frequency components 406 and 408 in FIG. 6. However these relatively low level perturbations are more acceptable than the much larger component 402 for motor stability. Once optimized for phase and amplitude, the error correction circuit 100 or 200 requires no further adjustment. A further indication of the corrective nature of the circuits 100 and 200 may be seen in examining the drive current supplied by the power drive circuit 50. FIG. 7 depicts a motor drive current before the provision of a correction circuit while FIG. 8 depicts the same current after the provision of a correction circuit.

FIGS. 1 and 2 depict error correction circuits 100 and 200 for eliminating tachometer coherent error contribution (tach runout). When the motor 16 is being driven, additional coherent errors are generated by the motor itself. These errors may combine with or cancel the tachometer generated errors. In any event, they also contribute to the generation of the coherent error FM sidebands in the high output signal. It is further envisioned that the invention be used to correct for coherent error contributions from the motor itself. This necessitates using the same error correcting circuits in a slightly different arrangement in the speed control circuit. The only difference between such a correction circuit and the correction circuits 100 and 200 of FIGS. 1 and 2 is that summing junction 112 is not located after the loop filter 56 as is indicated in FIG. 9 instead of before the filter as in Figs. 1 and 2.

Figure 9:
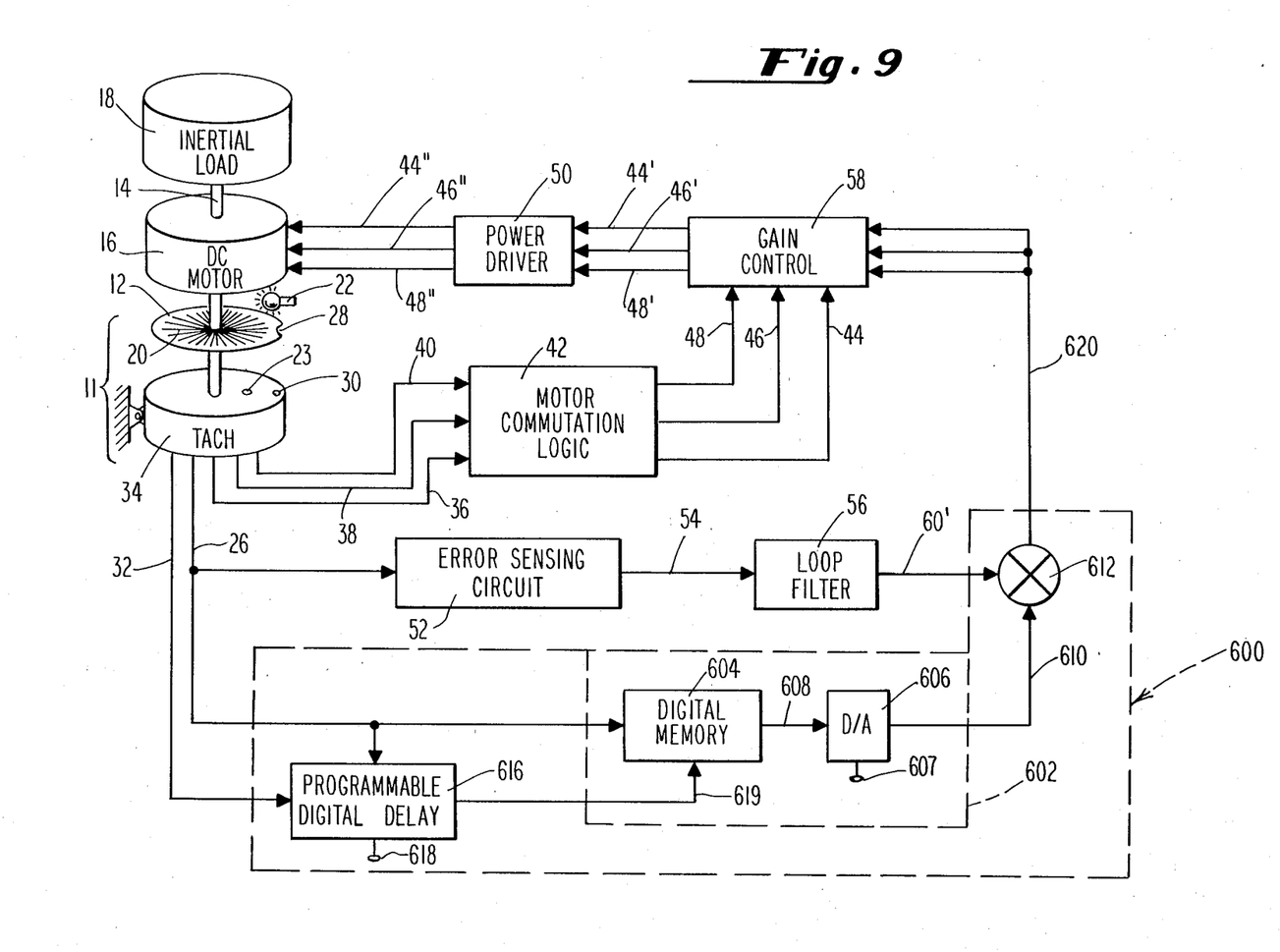
FIG. 9 is a motor speed control circuit with error correcting circuit correcting for coherent torque ripple error.

In FIG. 9, the torque ripple error correction circuit 600 includes a correction function generator circuit 602 comprising a digital memory unit 604, a variable amplitude digital to analog converter 606, and programmable digital delay 616 identical to the comparable components of the error correction circuit 100 of FIG. 1. However, a summing junction 612 is now provided downstream of the control loop filter 56 for combining the phase error signal on line 54, carried after filtering, on line 60; the correction signal is outputted on line 610 by the digital to analog converter 606. A corrected error signal is now passed on line 620 to the gain control circuit 58 from the junction 612. This circuit is adjusted in the same manner as those of FIGS. 1 and 2. If desired, a correction circuit like that in FIGS. 1 and 2 may be installed between the error sensing circuit 54 and log filter 56 of FIG. 9, in the manner depicted in FIGS. 1 and 2, for providing both tach runout and torque ripple corrections.

It should be understood that while the present invention has been described in detail with respect to certain illustrative and specific embodiments, it should not be considered limited to such embodiments and may be practiced by other methods and with other apparatus without departing from the invention, the scope of which is defined by the appended claims.

It is claimed:

1. An improved velocity control system for a member moved by a drive means comprisng:
   encoder means for dividing a movement of the member into a plurality of substantially regularly spaced sequential segments;
   sensing means cooperating with the encoder means for generating a high output signal of sequential pulses, each pulse being generated in conjunction with the member traversing a single segment and the frequency of the sequential pulses being indicative of velocity of the member;
   means for generating a reference pulse signal, the frequency of pulses of the reference signal representing a desired instantaneous velocity of the member;
   error sensing means responsive to the high output signal and the reference pulse signal for generating an error signal indicative of the difference between velocity indicated by the high output signal and a desired instantaneous velocity;
   correction means responsive to said pulses of the high output signal for generating a predetermined coherent error correction signal of varying value in synchronization with the movement of said member, the value of the correction signal being the same each time the moving member is traversing the same segment; and
   means combining the error signal and the correction signal for generating a corrected error signal having a diminished coherent error component in comparison with said error signal, the drive means being responsive to the corrected error signal.

2. The velocity control system of claim 1 wherein said correction means comprises memory means outputting a plurality of correction values in sequence, each correction value being outputted in response to a pulse of the high output signal.

3. The velocity control system of claim 1 further comprising:
control loop filter means between the combining means and the drive means for limiting the corrected error signal passed to the drive means.

4. The velocity control system of claim 1 further comprising:
control loop filter means between said error sensing means and the combining means for limiting the error signal passed to the drive means; and
wherein said means for combining combines the error signal and the correction error signal after filtering the error signal with the control loop filter means.

5. A digital tachometer control system with coherent error correction for use with a rotating member comprising:
incremental angle encoder means for subdividing each full rotation of the rotating member into a series of substantially regularly spaced, incremental segments;
means cooperating with the incremental angle encoder means during rotation of the member for generating a high output signal of sequential pulses having a frequency indicative of angular velocity of the member, each pulse being generated for a movement through one incremental segment during rotation of the member;
means for generating a reference signal indicating a desired velocity of the member;
error sensing means responsive to the high output signal and the reference signal for generating a velocity error signal indicative of the difference between velocity indicated by the high output signal and a desired velocity;
error correcting means for generating a predetermined coherent error correction signal as a function of incremental position of the member, the correction signal having the same value for the same incremental position of the member during rotation of the member; and
means combining the error signal and the correction signal for generating a corrected error signal having a diminished coherent error component compared with said error signal.

6. The control system of claim 5 wherein said error correcting means comprises:
memory means for storing a plurality of digital values and for outputting said values in a predetermined sequence during rotation of the tachometer.

7. The control system of claim 6 wherein said memory means outputs a single digital value in response to a pulse of the high output signal.

8. The control system of claim 7 further comprising means for generating an index pulse once during each full rotation of the rotating member on each occasion when the member is located at a predetermined angular position; and said error correcting means is further responsive to said index signal for reinitiating the output of said digital values in the predetermined sequency during the following rotation cycle of the tachometer.

9. The control system of claim 8 wherein said error correcting means further comprises:
delay means responsive to said index pulse for generating a reset signal outputted to the memory means for reinitiating the output of the stored digital values in the predetermined sequency beginning in the subsequent rotation cycle of the tachometer.

10. The control system of claim 9 wherein said error signal is analog; and said error correcting means further comprises digital to analog conversion means coupled to the digital value output of the memory means.

11. The control system of claim 10 wherein said digital to analog conversion means includes means for adjusting the amplitude of an analog signal generated by said conversion means.

12. The control system of claim 11 wherein the delay means is further responsive to the high output signal and generates said reset signal passed to the memory means a predetermined number of high output signal pulses after the occurance of the index pulse.

13. The control system of claim 12 wherein said delay means further comprises means for adjusting the number of high output signal pulses between the index pulse and the generation of the reset signal.

14. The control system of claim 10 wherein the stored digital values approximate the relative amplitudes of at least a portion of a period of a trigonometric function approximating said coherent error.

15. The control system of claim 10 wherein said error correcting means comprises:
a plurality of individual digital memory units, each memory unit storing digital values approximating the relative magnitudes of a separate sine or cosine trigonometric function for at least a portion of a complete period of the trigonometric function.

16. In a motor speed control system for a DC motor with drive shaft comprising:
digital tachometer means cooperating with the drive shaft for generating a high output signal of a predetermined multiplicity of pulses during each rotational cycle of the drive shaft, the frequency of said pulses indicating instantaneous motor speed;
means for generating a reference signal having a frequency representing a desired instantaneous motor speed;
error means responsive to the pulses of the high output signal for generating an error signal having a magnitude related to the difference between instantaneous motor speed indicated by the high output signal pulses and the desired instantaneous motor speed indicated by the reference signal; and
gain control means responsive to said error means for adjusting the magnitude of an electric current supplied to the motor for rotating the drive shaft, the improvement comprising:
function generation means responsive to pulses of the high output signal for outputting during each rotation of the shaft, a predetermined, coherent error correction signal having a varying magnitude; and
means for combining the error signal and the correction signal to generate a corrected error signal having a reduced coherent error component in comparison with the error signal, the gain control means being responsive to the corrected error signal.

17. In the motor speed control system of claim 16 further comprising a control loop filter circuit between said error means and said gain control means, said improvement further comprising:

said correction signal magnitude being related to coherent torque ripple error in the error signal and said means for combining being located between said control loop filter circuit and said gain control means.

18. In a method of operating a digital tachometer comprising the steps of:

generating during each rotational cycle of the digital tachometer, a high output signal comprising a multiplicity of sequential pulses;

generating accurately spaced timing pulses;

comparing phases of the pulses of the high output signal and the timing pulses at a common base frequency;

generating as a result of said phase comparing step a phase error signal related to the magnitude of the phase difference between pulses of the high output signal and pulses of the reference frequency signal; the improvement comprising the steps of:

generating during each rotation cycle of the tachometer a correction signal identical from rotational cycle to rotational cycle of the tachometer and having a varying magnitude related to coherent phase error in the high output signal; and combining the correction signal and error signal to generate a corrected tachometer error signal having a reduced coherent error component in comparison with said phase error signal.

* * * * *